United States Patent
Hickman et al.

(10) Patent No.: US 8,307,061 B1
(45) Date of Patent: Nov. 6, 2012

(54) SYSTEM AND METHOD FOR DETERMINING MANUFACTURER INSTRUCTIONS EXECUTABLE BY A ROBOTIC DEVICE

(75) Inventors: Ryan Hickman, Mountain View, CA (US); Damon Kohler, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/283,358

(22) Filed: Oct. 27, 2011

(51) Int. Cl.
*G06F 15/16* (2006.01)
*G05B 19/418* (2006.01)

(52) U.S. Cl. .... 709/223; 709/200; 700/245; 318/568.12

(58) Field of Classification Search ............... 709/200, 709/223; 700/245–249; 318/568.12
See application file for complete search history.

(56) References Cited

U.S. PATENT DOCUMENTS

| | | | |
|---|---|---|---|
| 5,268,837 A * | 12/1993 | Saylor | 700/61 |
| 6,597,143 B2 * | 7/2003 | Song et al. | 318/581 |
| 7,673,801 B2 | 3/2010 | Park et al. | |
| 8,027,750 B2 * | 9/2011 | Orita et al. | 700/253 |
| 2002/0060542 A1 * | 5/2002 | Song et al. | 318/568.12 |
| 2007/0001012 A1 | 1/2007 | Kim et al. | |
| 2010/0212565 A1 | 8/2010 | Clayman | |
| 2010/0320189 A1 | 12/2010 | Buchheit | |
| 2011/0010007 A1 * | 1/2011 | Sarh et al. | 700/248 |
| 2012/0072023 A1 * | 3/2012 | Ota | 700/259 |

FOREIGN PATENT DOCUMENTS

WO 2007112577 10/2007

* cited by examiner

*Primary Examiner* — Moustafa M Meky
(74) *Attorney, Agent, or Firm* — McDonnell Boehnen Hulbert & Berghoff LLP

(57) ABSTRACT

Examples disclose systems and methods related to manufacturer submitted robot instructions. The method may be executable to receive from a robotic device an identifier of an object and based on the identifier, determine a manufacturer of the object, and identify in a database first instructions associated with the identifier of the object, wherein the manufacturer instructions may be associated with the manufacturer of the object and executable by the robotic device to interact with the object. The method may further be executable to send a query to the robotic device regarding an interaction between the robotic device and the object and receive a query response indicating information associated with an interaction between the robotic device and the object. Based on the query response, the method may be executable to identify second instructions executable to perform the interaction with the object and send the second instructions to the robotic device.

20 Claims, 9 Drawing Sheets

SYSTEM AND METHOD FOR DETERMINING MANUFACTURER INSTRUCTIONS EXECUTABLE BY A ROBOTIC DEVICE

BACKGROUND

Cloud computing refers to the provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software that collect commands from the user and interpret the commands into commands on the servers. The servers may handle the computing, and can either store or retrieve information from database servers or file servers and display an updated page to the user. Through "cloud computing", data across multiple servers can be synchronized around the world allowing for collaborative work on one file or project, from multiple users around the world, for example.

SUMMARY

Embodiments disclose systems and methods related to manufacturer submitted robot instructions. An example method may be performed by a computing system having a processor and memory and may include receiving from a robotic device having a mechanical actuator an identifier of an object and, based on the identifier, determine a manufacturer of the object. The method may also include identifying in a database first instructions associated with the identifier of the object. The first instructions may be manufacturer instructions associated with the manufacturer of the object. The manufacturer instructions may be executable by the robotic device to interact with the object. The method may also include sending a query to the robotic device regarding an interaction between the robotic device and the object and receiving a query response indicating information associated with the interaction between the robotic device and the object. Based on the query response, the computing system may modify the first instructions to obtain second instructions that may be executable by the robotic device to perform the interaction with the object. The second instructions may be sent to the robotic device.

In another example, a computing system may include at least one processor, a non-transitory computer-readable medium, and program instructions stored on the non-transitory computer-readable medium and executable by the at least one processor to cause the computing system to perform a number of functions. For example, the program instructions may be executable to receive from a robotic device an identifier of an object and, based on the identifier, determine a manufacturer of the object. The program instructions may be further executable to identify in a database first instructions associated with the identifier of the object. The first instructions may be manufacturer instructions associated with the manufacturer of the object. The manufacturer instruction may be executable by the robotic device to interact with the object. The program instructions may also be executable to send a query to the robotic device regarding an interaction between the robotic device and the object and to receive a query response indicating information associated with a mechanical interaction between the robotic device and the object. Based on the query response, the program instructions may modify the first instructions to obtain second instructions executable by the robotic device to perform the interaction with the object and send the second instructions to the robotic device.

In another example, a non-transitory computer-readable medium may have stored thereon instructions executable by a computing device having at least one processor to cause the computing device to perform functions. The functions may include receiving from a robotic device having a mechanical actuator an identifier of an object and, based on the identifier, determining a manufacturer of the object. Additional functions may include identifying in a database first instructions that may be associated with the identifier of the object. The first instructions may be manufacturer instructions associated with the manufacturer of the object. The manufacturer instructions may be executable by the robotic device to interact with the object. Additional functions may include sending a query to the robotic device regarding an interaction between the robotic device and the object and receiving a query response indicating information associated with a mechanical interaction between the robotic device and the object. Based on the query response, the functions may further include modifying the first instructions to obtain second instructions that may be executable by the robotic device to perform the interaction with the object. The second instructions may be sent to the robotic device.

In yet another example, a method may be performed by a robotic device having at least one sensor. The method may be executable to obtain data associated with an object identifier, wherein the object identifier may be one of (i) a barcode and (ii) a radio frequency identifier. The method may be further executable to send data associated with the object identifier to a server and to receive a query from the server, wherein the query may include a list of interactions associated with the object identifier and executable by the robotic device. The method may also be executable to send a query response to the server, wherein the query response may include an interaction selected from the list of interactions. Moreover, the method may be executable to receive instructions associated with the selected interaction and executable by the robotic device.

DETAILED DESCRIPTION

Figure 1:
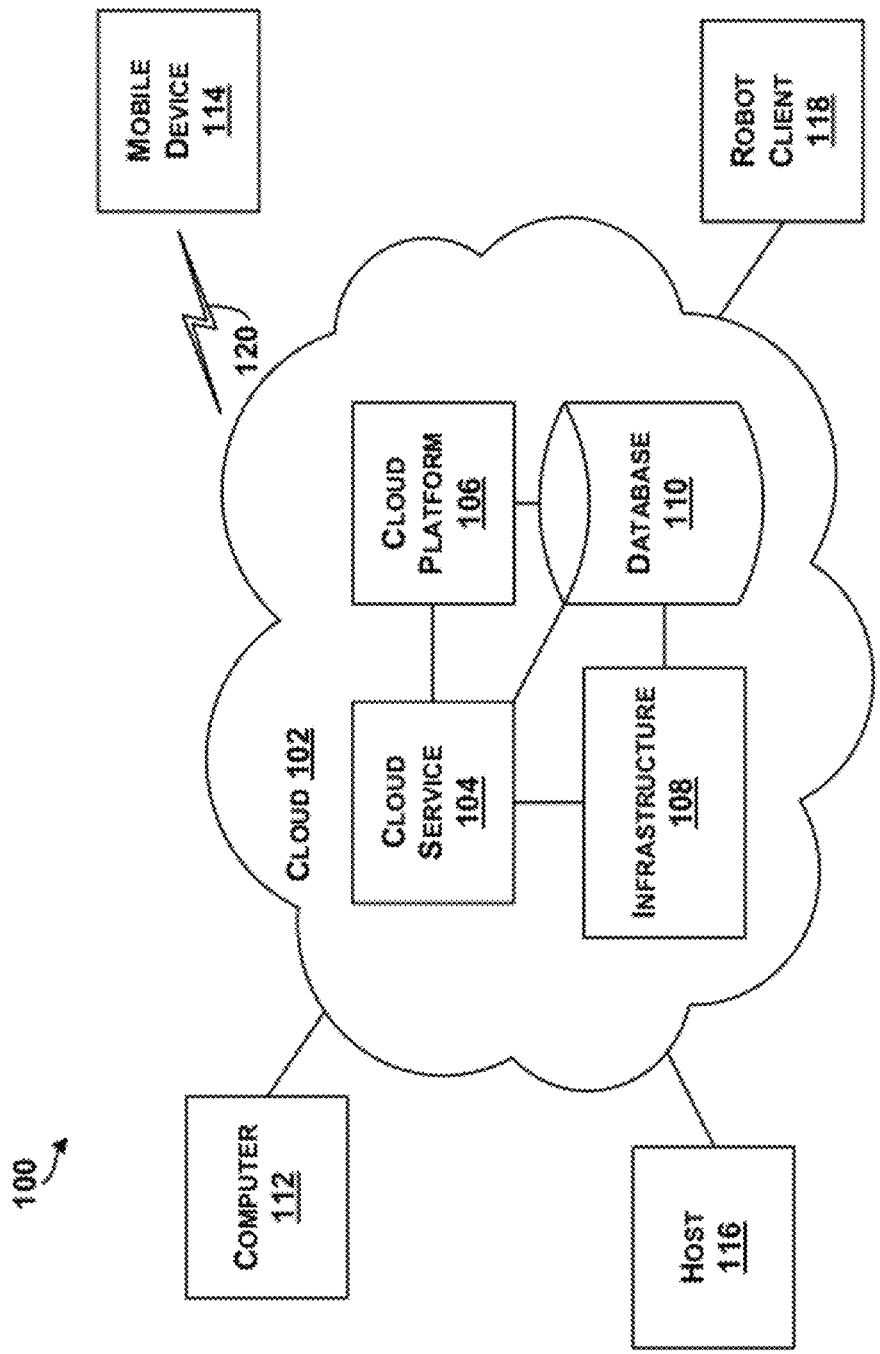
FIG. 1 is an example system for cloud-based computing.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for robot cloud computing. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from robot depending on requirements. In some examples, a robot may be configured to receive a second device, such as a mobile phone, that may be configured to function as an accessory or a "brain" of the robot.

In examples described herein, a robot may interact with the cloud to perform any number of actions, such as to share information with other cloud computing devices. Within examples, a robot may interact with the cloud to facilitate object recognition, to perform a mapping function, or to perform navigational functions (i.e., receive a map/navigation pathway previously traversed by another robot). In other examples, a robot may interact with the cloud to perform mapping of objects in an area, to perform inventory of objects, and to perform voice recognition/control by a robot. A robot may perform any actions or queries to the cloud as described herein based on contextual or situational information.

In examples, robots may interact mechanically, electromechanically, and/or electronically with multiple different objects. The robot's interactions with an object are defined by one or more computer-executable instructions, which may be stored on a robot and/or a server (e.g., a cloud.) To access instructions stored on the server, a robot may identify what object the robot wants to interact with. This may be performed by the robot scanning the object for an identifier such as a barcode, RFID, etc. The robot may send the information associated with the object identifier to the server. Using this information, the server may identify the object that the robot is trying to interact with. The server may also associate the object identifier with computer-executable instructions that, when executed, may allow the robot to interact with the object.

Multiple different types of interactions may occur between the robot and the object. Computer-executable code associated with each of these instructions may be stored in a database on the server. In embodiments, the server may be able to identify computer-executable instructions that are executable by the robot to interact with the object based solely on the object identifier. However, in examples, the server may need information in addition to the object identifier to determine which instructions to send to the robot. Example information may include manufacturer information, robot information, etc. The manufacturer information may broadly include the manufacturer, distributor, retailer, etc. or the object and/or robot.

In embodiments, the server may send a query to a user device (e.g., the robot, cellular telephone, etc.) requesting more information on what interaction should be performed. The robot, or a user, may respond to the query via the user device. The server may receive the query response and determine which instructions in the database may be used to accomplish the desired interaction. This determination may include modifying one or more of the existing instructions by excluding unneeded or irrelevant instructions, adding additional instructions, changing one or more instructions to be specific to the robot executing the instructions, etc. After the modifications are complete or substantially complete for purposes of execution, the server may send the instructions to the robot. The robot may use the instructions to interact mechanically, electromechanically, and/or electronically with the object.

1. Cloud Computing Architecture

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more of fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device or transmitter including a laptop computer, a mobile telephone, etc., that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

2. Example Robot Architecture

Figure 2A:
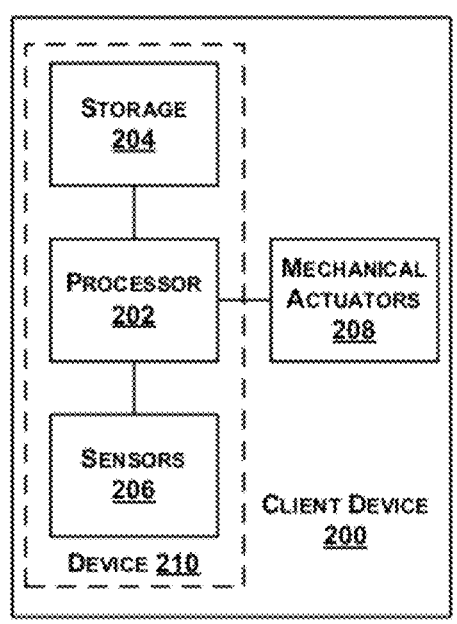
FIG. 2A illustrates an example client device.

FIG. 2A illustrates an example client device 200. In one example, the client device 200 is configured as a robot. In some examples, a robot may contain computer hardware, such as a processor 202, memory or storage 204, and sensors 206. For example, a robot controller (e.g., processor 202, computing system, and sensors 206) may all be custom designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot. Example sensors may include, smoke sensors, light sensors, radio sensors, infrared sensors, microphones, speakers, gyroscopes, accelerometer, a camera, radar, capacitive sensors and touch sensors, etc.

The client device 200 may also have components or devices that allow the client device 200 to interact with its environment. For example, the client device 200 may have mechanical actuators 208, such as motors, wheels, movable arms, etc., that enable the client device 200 to move or interact with the environment.

In some examples, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some example, the client device 200 may be configured to receive a device, such as device 210, that includes the processor 202, the storage 204, and the sensors 206. For example, the client device 200 may be a robot that have a number of mechanical actuators (e.g., a movable base), and the robot may be configured to receive a mobile telephone to function as the "brains" or control components of the robot. The device 210 may be considered a module of the robot. The device 210 may be physically attached to the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone), which can provide additional peripheral components to the device 200, such as any of an accelerometer, gyroscope, compass, GPS, camera, WiFi connection, a touch screen, etc., that are included within the device 210.

Figure 2B:
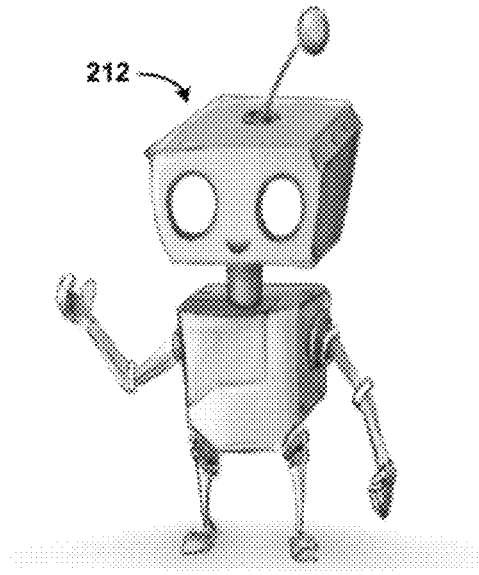
FIG. 2B illustrates a graphical example of a robot.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

Figure 2C:
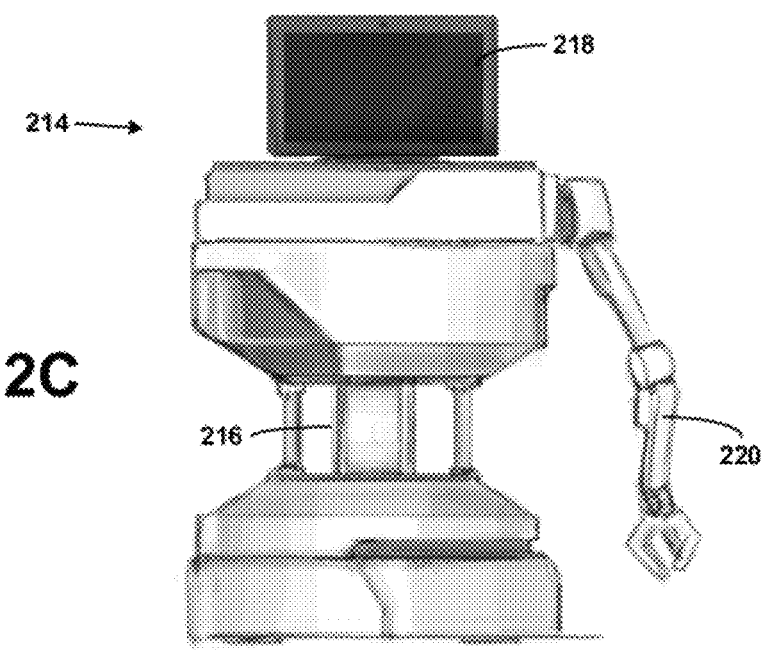
FIG. 2C illustrates another example of a robot.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

3. Robot and Cloud Interaction

Figure 3:
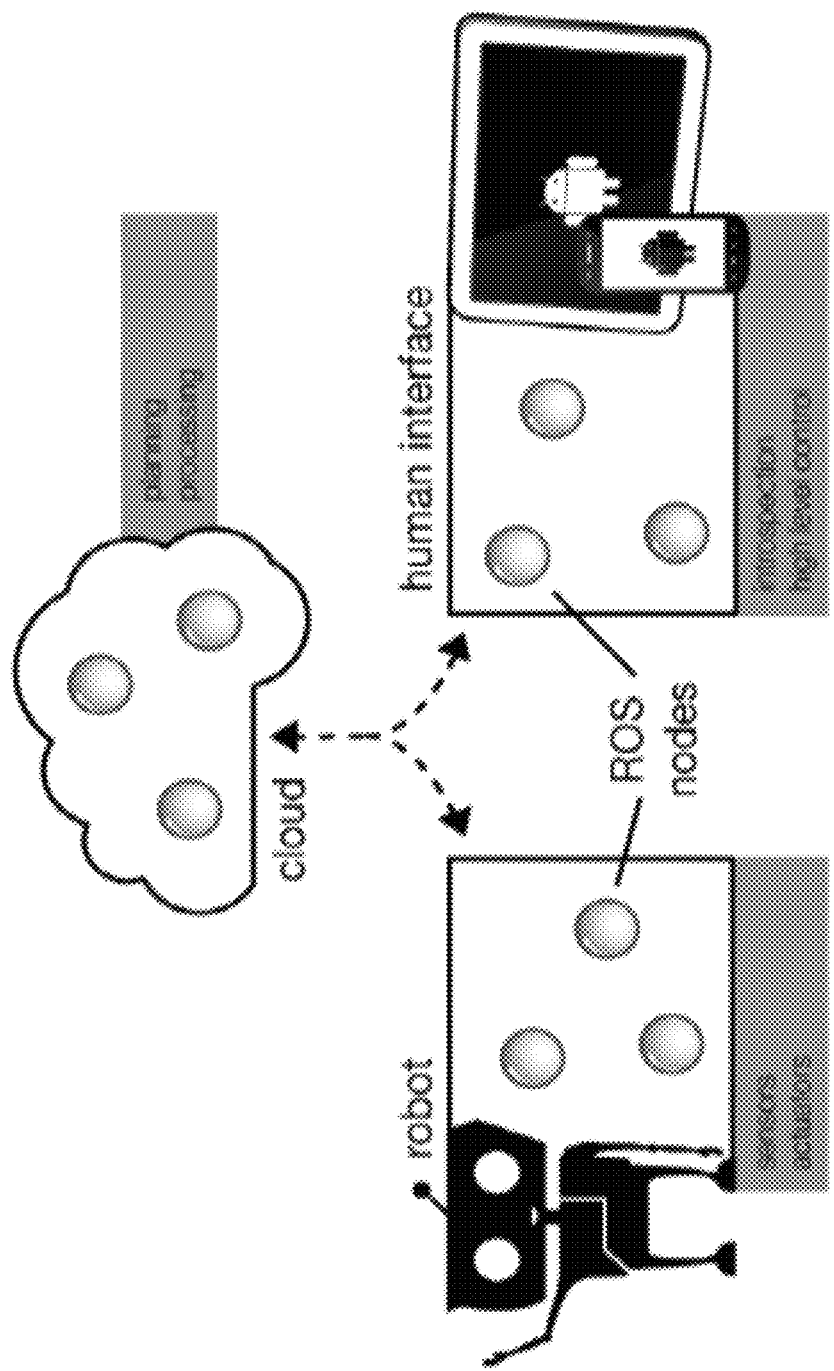
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example the robot may receive data from the cloud. The data received from the cloud may be in many different forms. The received data may be a processed form of data the robot sent to the cloud. The received data may also come from sources other than the robot. For example, the cloud may have access to other sensors, other robots, and the internet.

Figure 4:
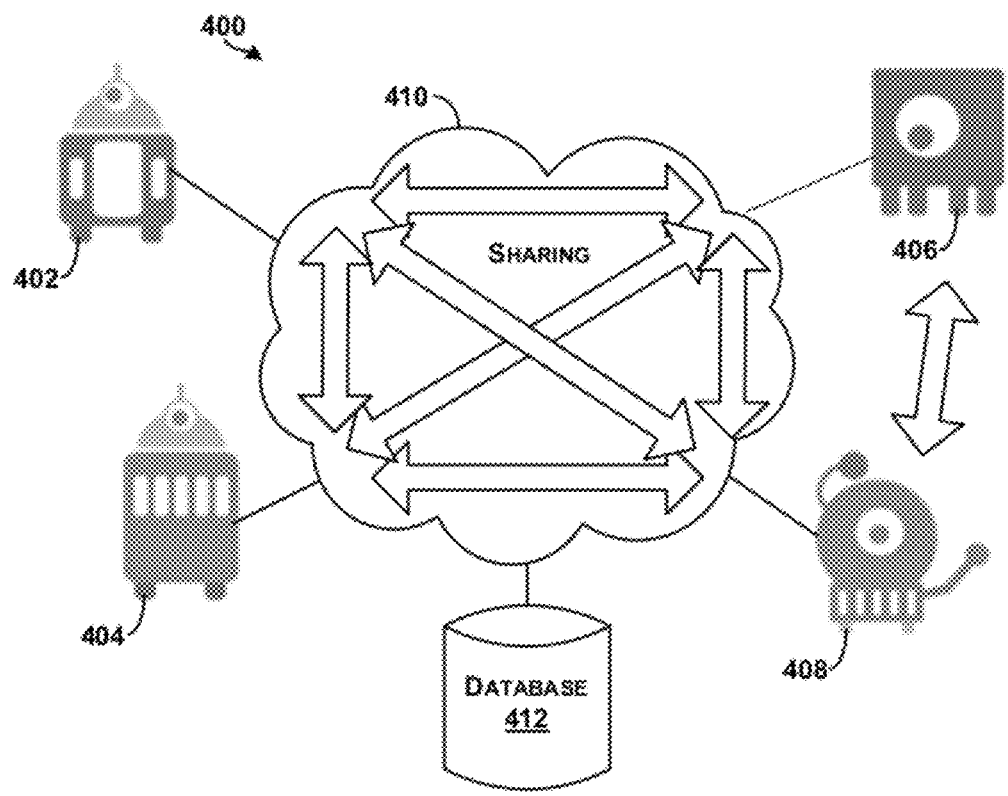
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program on the cloud 410 may be configured to identify the object in the picture and provide data to all the robots connected to the cloud 410 about the recognized object, as well as possibly about other characteristics (e.g., metadata) of the recognized object, such as a location, size, weight, color, etc. Thus, every robot may be able to know attributes of an object in a photo uploaded by the robot 402.

In one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, etc., any detail that may be associated with the object) that can be accessed by the robots 402, 404, 406, and 408 to perform object recognition. As an example, information regarding use of an object can include, e.g., such as for a phone, how to pick up a handset, how to answer the phone, location of buttons, how to dial, etc.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model, etc.). Each object may include information in the database 412 including an object name, object details, object distinguishing characteristics, etc., or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a computer), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge-base stored in the cloud 410. Within examples, the robots 402, 404, 406, and 408 may share information through the cloud 410, and may access the database 412.

Figure 5:
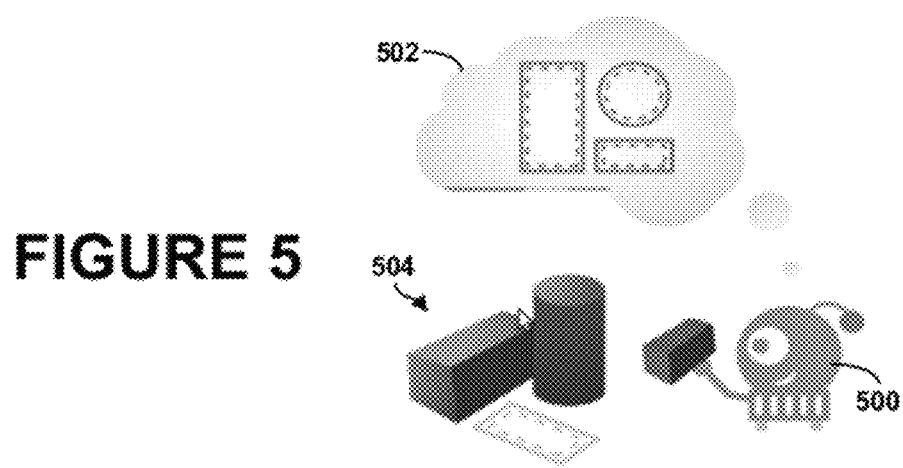
FIG. 5 is an example conceptual illustration of a robot interacting with a cloud to perform object recognition and interaction.

FIG. 5 is an example conceptual illustration of a robot 500 interacting with a cloud 502 to perform object recognition and interaction, or other functions. In an exemplary method for performing object recognition, objects may be tagged with a type of identifier (e.g., radio frequency identification (RFID) chip, near field communication chip (NFC), barcode, etc.), so that a robot may include an application enabling the robot to identify the object based on the identifier. The identifier may provide information about the object including an identification, details of the object (mass, color, type, brand, etc.), a location of the object, etc. In some examples, objects may emit beacons that can be received by the robots to determine existence/identification/location of the object. In this example, a physical environment may be instrumented with beacons in forms of NFC, RFID, QR (quick response) codes, etc. to enable a robot to localize and identify objects. Beacons may be stationary beacons or moving beacons (RFID in an employee's ID badge) to perform tracking of objects.

In some examples, object recognition may be facilitated by a higher-level service (e.g., higher in a software stack), such that details and specifics for how to recognize an object may be performed by the cloud. The robot 500 may be configured to perform actions/functions based on a result of object recognition, rather than or in addition to, performing functions regarding recognizing an object. As an example, the robot 500 may execute software to perform function calls, such as GetObject( ) which may return information associated with an object (e.g., a cereal box), or PickUpObject( ) which may cause the robot 500 to pick up the object. Enabling function calls and operation of robots through the cloud facilitates control and operation of the robot 500 without having to control or operate various sensors/mechanical aspects of the robot 500, for example.

The robot 500 may interact with an object (such as any of objects 504), and interact with the cloud 502 as described above to further interact with the object. In some examples, the robot 500 may perform an action based on information received from the cloud 502. The action may vary based on a type of received information, or the query that is presented by the robot. As an example, a robot may capture an image of a coffee maker, provide the image to the cloud, and in response receive details about the coffee maker including an identity, model number, and instructions for use. The robot may then perform actions according to the instructions for use to use the coffee maker.

Figure 6:
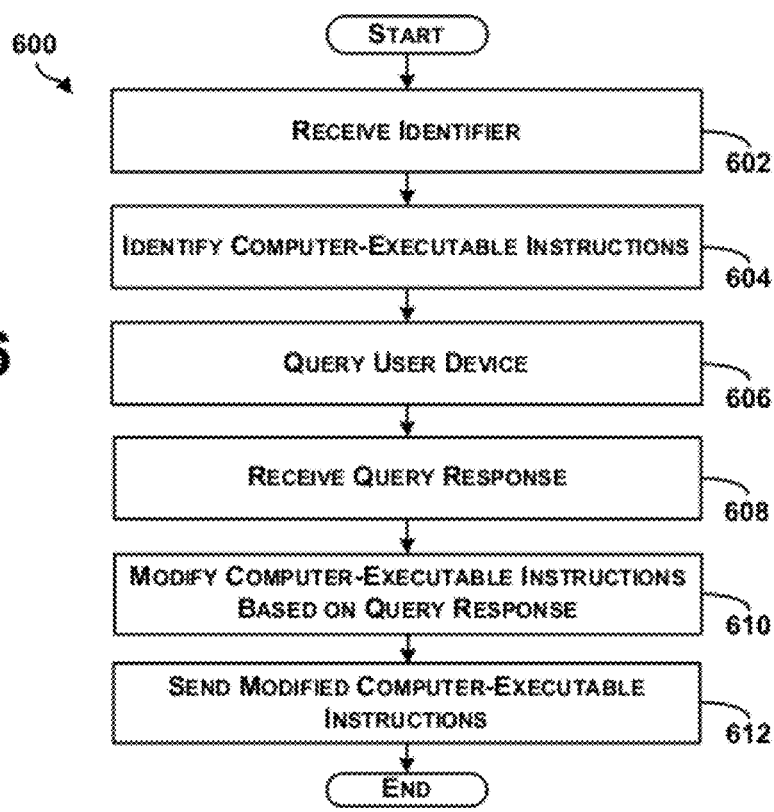
FIG. 6 is a block diagram of an example method for processing data from a robot.

FIG. 6 is a block diagram of an example method for processing data from a robot, in accordance with at least some embodiments described herein. Method 600, shown in FIG. 6, presents an embodiment of a method that, for example, could be used with the systems 100 and 400, and may be performed by a device, such as another device illustrated in FIGS. 1-4, or components of the device. The various blocks of method 600 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive.

At block 602, the method 600 includes receive identifier. The identifier may be associated with an object. An object may be any tangible thing. The identifier may be a signal, 1D barcode, 2D barcode (such as a QR code), RFID, NFC chip, etc., attached to or otherwise associated with the object. For example, the object may be an audio system. A 2D barcode may be attached to the audio system and may be used to identify the audio system. A robot or other computing device may be able to scan the 2D barcode and send the 2D barcode or information encoded in the 2D barcode to a server. The server may broadly include a cloud.

In embodiments, the identifier may be based on recognition of an object. For example, a robot may scan an image of the object. From this image, the robot, server, cloud, etc., may recognize the object and ascertain an identifier that may be associated with the recognized object. When the recognition is performed by the server, the ascertained identifier may be sent to the robot or maintained at the server. When the recognition is performed by the robot, then the robot may send the ascertained identifier to the server. Thus, any of a robot, server, cloud, etc., may receive the identifier from the object.

At block 604, the method 600 includes identify computer-executable instructions. The server may receive the identifier from the robot and determine what information is associated with the identifier. This information may be stored in a database and indexed by the identifier, for example. Example information that may be associated with the identifier may include manufacturer information, an identifier of the robot, etc. The manufacturer information may include a manufacturer name, serial number, model number, etc. The manufacture information may further include distributor, retailer, or third-party data associated with the object and/or robot, for example. The identifier of the robot may include a robot model number or a unique robot identifier, for example. In embodiments, the identifier of the robot may be in the form of a 1D barcode, 2D barcode, NFC chip, etc., which may be scannable by the robot or any other computing device capable of reading the identifier. The server may use the identifier of the object, or any information associated therewith, to identify computer-executable instructions.

The computer-executable instructions may be executed by a robot or other computing device to interact with the object associated with the identifier. The computer-executable instructions may be manufacturer computer-executable instructions, which are instructions specific to the manufacturer of the object and executable to utilize the object. In embodiments, the manufacturer may broadly include distributors, retailers, third-parties, etc. The computer-executable instructions may optionally be user programmed instructions, which may be unique to a specific interaction between a specific robot and a specific object. The user programmed instructions may also or alternatively be an alteration of existing computer-executable instructions, such as manufacturer computer-executable instructions. In examples, the computer-executable instructions may be associated with one or more of the identifier of the object, the identifier of the robot, the manufacturer, etc.

In an example, the server may receive from the robot an identifier in the form of a 1D barcode scan associated with an audio system. The server may also receive from the robot an identifier of the robot. Using the 1D barcode scan, i.e., the identifier, the server may identify the manufacturer of the audio system and may also identify computer-executable instructions associated with the manufacturer. The manufacturer instructions may be executed to instruct the robot to operate the audio system. Example operations may include turning the audio system on or off, adjusting the volume on the audio system, stopping the audio system, etc. The manufacturer instructions may be specific to the robot or generic to multiple robots.

At block 606, the method 600 includes query user device. More specifically, a server may query a user device such as a robot, portable computer, cellular telephone, personal digital assistant (PDA), etc. In embodiments, the query may provide the user device or robot with one or more options or computer-executable instructions that may be performed by the robot to interact with the object. The options may be presented to the user through a graphical user interface (GUI), for example. The user may select one or more of the presented options or computer-executable instructions. Optionally, the user may add, customize, and/or purchase different computer-executable instructions. The user's selected, added, and/or purchased computer-executable instructions may be a query response.

In an example, the server may have identified multiple computer-executable instructions that may be executable by a robot to perform an interaction with an object. Example interactions between the robot and the object (e.g., the audio system) may include turning the audio system on or off, changing an audio channel, adjusting the volume at the audio system, etc. In embodiments, the server may not have enough information to determine which of these interactions the robot should perform. Therefore, the server may send a query to the user device or to the robot requesting a response. The query may ask the user or the robot to select what interaction the robot should perform and/or details on how the interaction may be performed. In embodiments, the robot may receive the query and respond to the query using internal logic, artificial intelligence algorithms, historical data, etc.

At block 608, the method 600 includes receive query response. The query response may be sent from the user device or robot to the server. The query response may include a subset of the computer-executable instructions that were sent to the user device, computer-executable instructions that were added or purchased using the user device, one or more default or preprogrammed computer-executable instructions, etc. In embodiments, the query response may be an indication of one or more computer-executable instructions rather than the actual computer-executable instructions. The query response may be numeric, alphabetic, or alphanumeric.

In examples, a user may be presented with a query having multiple possible interactions from which to choose, such as turning an audio system on or adjusting the volume at the audio system. Of these interactions, the user may select to change the volume at the audio system, for example. This selection may be a query response. Optionally, one or more additional queries or subqueries may be presented to the user based on the user's selection to change the volume at the audio system. The subquery may include whether to increase or decrease the volume. In examples, the query or subquery may allow the user to add a customization request, such as specifying a desired decibel level at the audio system. The query and/or subquery may be presented to the user along with the initial query from the server or separate from the initial query. In embodiments, the user's response to the subquery may be included or excluded from the query response.

At block 610, the method 600 includes modify computer-executable instructions based on query response. In particular, a server may receive a query response (e.g., from a user device or robot) and determine what computer-executable instructions, if any, may need to be modified based on the query response. The server may modify the computer-executable instructions (e.g., identified at block 604) by changing, adding, and/or removing computer-executable instructions based on the query response, for example. In embodiments, the modifying may be filtering computer-executable instructions that are associated with the identifier of the object to include those computer-executable instructions that may be required by the robot to accomplish a specific interaction with the robot. The modifying may further include adding information from the query response to the computer-executable instructions. The modifying may optionally include computer-executable instructions that are specific to the robot that may be executed by the robot to interact with the object. Examples also include modifying the computer-executable instructions according to default instructions programmed or otherwise selected by the user. The default instruction may include instructions that are not already stored in a database on the server.

As an example, the server may include multiple computer-executable instructions that instruct a robot to interact with the audio system including instructions to turn the volume at the audio system up or down. The server may query the user device for information on what interaction the robot should perform. In this example, the response to the query may include a customized request by a user to turn the volume to a specific decibel level. Therefore, the server may modify the computer-executable instructions to include those instructions that instruct the robot to interact with the audio system to cause the volume at the audio system to be set to the specified decibel level. In embodiments, this customized request may be added to the database of computer-executable instructions on the server and/or become default instructions that the robot may execute when tasked with changing the volume, for example.

At block 612, the method 600 includes send modified computer-executable instructions. Specifically, the server may send the modified computer-executable instructions to the robot or a user device. The robot may receive and execute the modified computer-executable instructions to interact with an object associated with the identifier.

Figure 7:
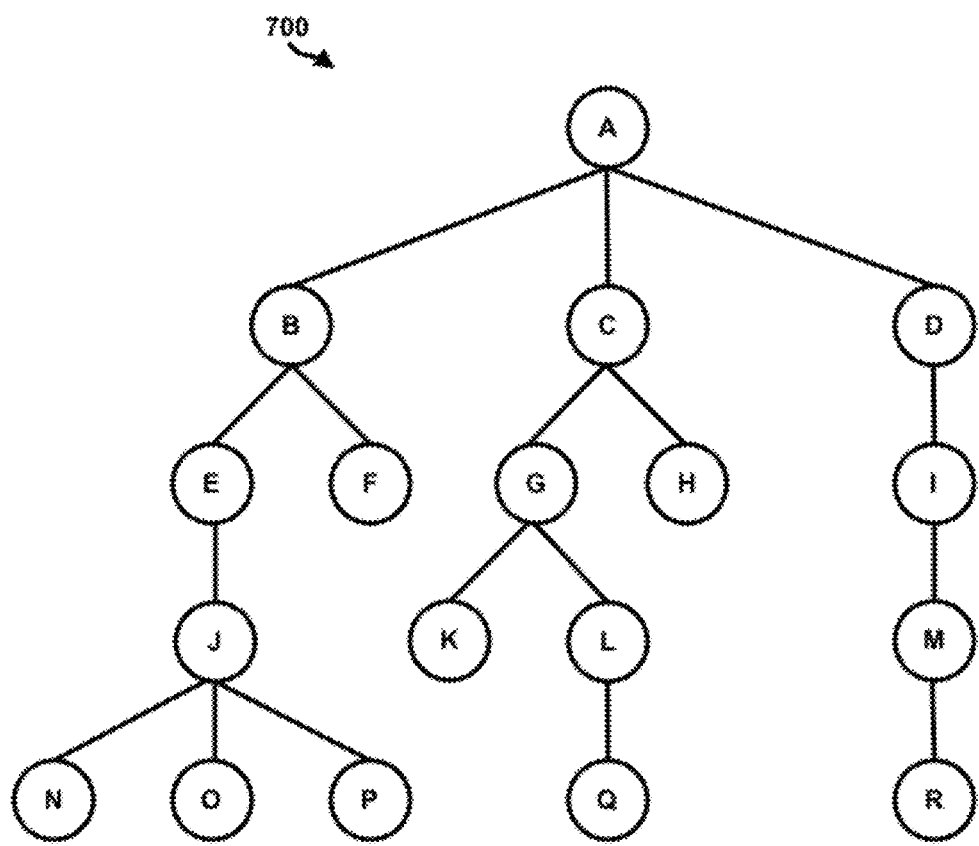
FIG. 7 illustrates an ordered directed tree.

FIG. 7 illustrates an ordered directed tree 700 according to examples described herein. FIG. 7 includes multiple nodes A-R, each of which may represent computer-executable instructions. For example, node A may include a base set of instructions, and nodes B-R may include instructions that may be performed after the instructions represented by node A. The decision on whether to perform instructions represented by node B, C, or D may be made using preprogrammed logic at the server or the robot. Optionally, the server may send the user a query (e.g., through the user device) to determine which instructions the user or robot may perform. The query response may be used to progress to node B, C, or D. This query process may continue whenever there are multiple instructions from which to choose from.

In an example, a robot may obtain images of an object such as a logo, shape, color, etc. Based on the images, the robot may recognize the object and determine an identifier associated with the object. The robot may send the identifier to the server. Optionally, the robot may send one or more of the images to the server such that the images alone or in combination with one another act as a temporary identifier until the server may recognize the object, for example. The server, which may use the identifier to identify multiple computer-executable instructions (e.g., nodes A-R) that may be associated with the audio system. Node A may represent instructions that instruct the robot to communicate with the audio system on a certain frequency, and nodes B-D may represent different interactions that may occur between the robot and the audio system. For example, node B may represent instructions for the robot to manually change the volume of the audio system. Node C may represent instructions for the robot to electronically adjust the base or treble of the audio system. Node D may represent instructions for the robot to manually insert a CD, DVD, blue-ray, or the like.

The server may query the user or robot (e.g., through a user device) to determine whether to change the volume, treble, base, insert a CD, etc. The user or robot may respond via a query response by indicating that the robot should change the volume. General instructions on the location of the volume knob or button on the audio system, as well as how to grasp, move, or otherwise interact with the knob or button may be represented by node B, for example.

Upon the user or robot selecting to change the volume, the next decision in the ordered directed tree 700 may be to determine what level to change the volume to. To this extent, node E may include instructions for analyzing the current volume level and determining whether the volume level should be increased or decreased. Node F may include instructions that are customized by the user, such as a default volume setting. The server may query the user (e.g., through a user device) to determine whether the user may want the robot to adjust the volume to the default volume setting (node F) or to a different setting (node E).

Each interaction between the robot and the object may include or cause a number of queries, which may be made before or while the robot is interacting with the object. In embodiments, a new query may be sent at each decision point. This may cause the robot to stop an interaction to obtain additional information about the interaction including additional computer-executable instructions that are executable to complete an existing interaction or perform a new interaction. Optionally, a query having a number of subqueries may be sent such that the user is presented with a number of queries at one time, the answers of which may be used to traverse the ordered directed tree 700. In further embodiments, the user may save the user's answers to one or more of the queries as default instructions so as to avoid being presented with the same query or queries in the future. The robot may perform the default instructions automatically or upon a user's indication that the robot should perform the default instructions.

Figure 8:
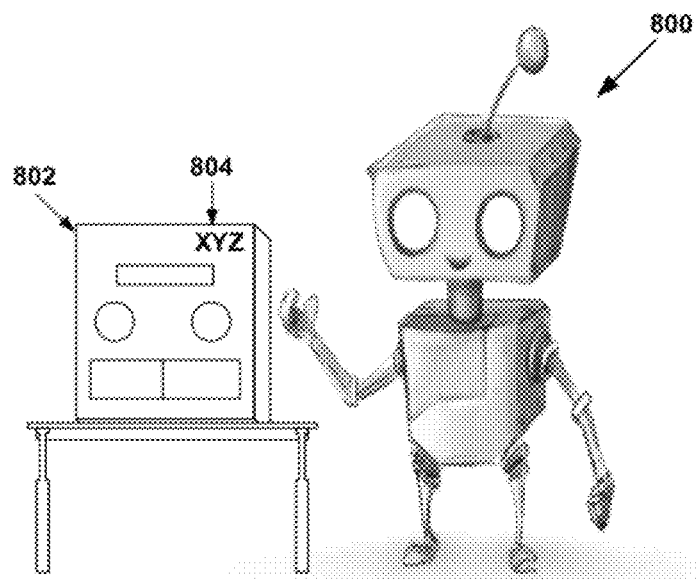
FIG. 8 is an example conceptual illustration of a robot interacting with an object based on computer-executable instructions from a server.

FIG. 8 is an example conceptual illustration of a robot 800 interacting with an object, which may include audio system 802, based on computer-executable instructions from a server. In this example, the robot 800 is interacting with an audio system 802. The interaction may begin by the robot 800 scanning the object 802. The scan may reveal that the object 802 includes a logo 804 that may indicate that the audio system 802 is a product manufactured by or sold under the name xyz. The robot 800 may also capture images of the object 802 from one or more angles to identify the object. In embodiments, the robot 800 may use the logo 804 and/or the images to recognize the object 802. The recognized object 802 may be associated with an identifier, such as a unique identifier or model number, which the robot may send to a server.

In addition or rather than perform the object recognition at the robot, the robot 800 may send the logo 804 and/or the images to a server for recognition. The recognition may be performed using any number of algorithms or techniques. As an example, the recognition may be performed by comparing the logo 804, or any portion thereof, to a database of logos to find a match. The matching logo may be associated with an object identifier or other interaction related to the object. This identifier may be sent to the robot 800 for storage until the robot 800 may need instructions to interact with the object 802, for example.

Upon identifying the object, the server may send a query to the user via the robot 800 or user device to determine what interaction the robot 800 should have with the object 802. For example, the server may send the robot 800 a query, which the robot 800 visually or audibly presents to the user. Thus, the robot 800 may audibly ask the user what action the robot 800 should perform and receive a response from the user answering the query, for example. In embodiments, a different user device, such as a portable computer, cellular telephone, personal digital assistant (PDA), etc., may be used to query the user in addition to or instead of querying the user via the robot. The user device may communicate with the server (e.g., on its own or via the robot 800) and receive computer-executable instructions from the server.

In an example, when asked what action the robot 800 should perform, the user may indicate that the robot should turn up the volume. This response may be received by the robot and sent to the server. The server may determine which computer-executable instructions may be used for adjusting the volume of the object 802 and may modify the instructions to instruct the robot 800 to increase the volume, for example. The server may then send the robot 800 the computer-executable instructions to increase the volume. The server may have knowledge of what actions the robot is capable of making and the server may send instructions to instruct the robot 800 on what knob to turn to adjust the volume, how to grasp the knob with the robot's 800 arm, how much torque to apply when turning the knob, how far to turn the knob, etc. These instructions may be mechanical, electromechanical, or electrical. The robot 800 may use these instructions to turn up the volume on the audio system 802, for example.

Figure 9:
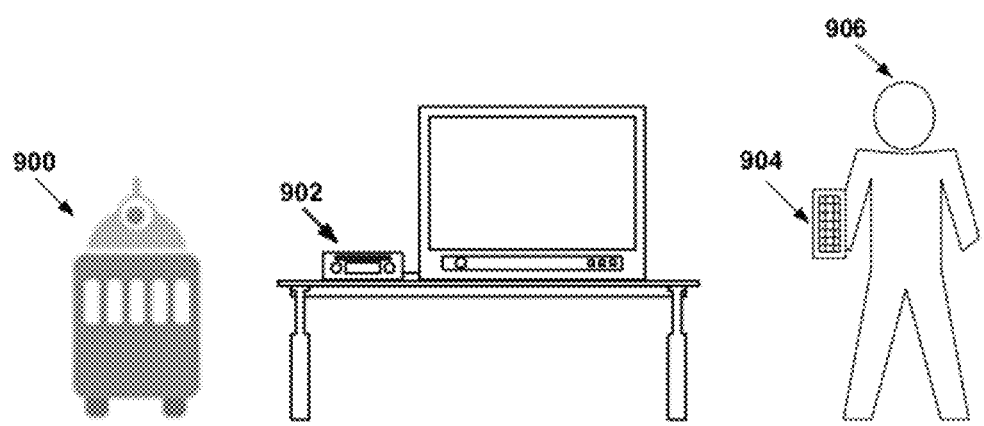
FIG. 9 is an example conceptual illustration of a robot interacting with an object based on computer-executable instructions from a server.

FIG. 9 is an example conceptual illustration of a robot 900 interacting with an object based on computer-executable instructions from a server. In FIG. 9, the objects may include a cable box 902 and a remote 904. The robot 900 may scan one or more of the objects 902, 904 and obtain identifiers for the scanned objects 902, 904. Using the identifiers, the robot 900 may obtain instructions from the server to interact with one or more of the objects 902, 904.

In an example, a user 906 may want to use the remote 904 to operate the cable box 902. However, the cable box 902 may be positioned such that the user 906 is unable to use the remote's 904 infrared (IR) signals to control the cable box 902. The user 906 may, therefore, use the robot 900 as an intermediary for communicating with the cable box. Specifically, the user 906 may give the robot 900 an audible command to turn on the "cable box", for example. The robot 900 may receive the command and obtain an identifier associated with the cable box 902. This may be performed by comparing the term "cable box" to a list of terms stored at the robot or on the server and determining which, if any, identifier is associated with the term "cable box", for example. In another example, the robot may determine the objects 902, 904 in a room and determine which of the objects 902, 904 is identified as a cable box, for example. Once determined, the robot 900 may obtain an identifier associated with the cable box 902 and send the identifier to the server. The server may then identify computer-executable instructions associated with actions that the robot 900 may perform to turn on the cable box 902. Optionally, the server may identify computer-executable instructions that instruct the robot 900 to communicate with the cable box 902 by emulating the remote 904 (e.g., by using one or more IR signals). Since the user's 906 audible command specified the desired action, i.e., turning on the cable box 902, the server may not need to query the user 906. Rather, the user's command may act as a query response to an implied query. Based on the user's 906 command, the server may determine which computer-executable instructions to send to the robot 900 to instruct the robot 900 to perform the task of turning on the cable box 902.

In other embodiments, the user 906 may be able to control the robot's 900 interaction with the cable box 902 using the remote 904. In this example, the remote 902 may be out of range for communicating with the cable box 902. The remote 902, however, may be able to communicate with the robot 900, which may be within range of the cable box 902. The robot 900 may receive a communication (e.g., a signal) from the remote 904 requesting that the robot 900 change the channel at the cable box. The communication may include an identifier for the remote 902. Alternatively, the robot 900 may use information about the signal frequency from the remote 904 to determine an identifier for the remote 904, for example. The robot 900 may send the identifier to the server, which may send a query to the user via the remote 904. The user 906 may or may not be aware of the query. Rather, the user's 906 normal interaction with the remote 904 (e.g., pressing buttons on the remote 904) may include data for the remote 904 to respond to the query. The server may then send computer-executable instructions that instruct the robot 900 to perform a task on behalf of the remote 904.

At some point after receiving the computer-executable instructions, the robot 900 may interact with the cable box 902 to perform the instructions. As described above, the robot 900 may interact with the cable box 902 by determining an identifier for the cable box 902 and sending the identifier to the server. In embodiments, the robot 900 may also indicate the task the robot 900 received from the remote 904, which may act as a query response. Using the identifier, the server may identify computer-executable instructions that allow the robot 900 to communicate with the cable box 902. One or more of these instructions may be modified by the task. The instructions may be sent to the robot 900 and executed to interact with the cable box 902. This allows the user 906 to use a remote 904 to control the robot 900 to interact with the cable box 902.

In another example, the user 906 may want to change the channel using the cable box 902; however, in this example, the remote 904 for the cable box 902 may be across the room from the user 906. The user 906 may want to interact with the remote 904 without having to go across the room. In embodiments, the robot 900 may be able to obtain computer-executable instructions to communicate with the remote 904, however, the robot 900 may not be able to obtain computer-executable instructions to interact with the cable box 902. In situations such as these, the user 906 may add or purchase computer-executable instructions that allow the robot 900 to communicate with the cable box 902. Optionally, the user 906 may interact with the robot 900 by selecting the device that the user 906 would like the robot 900 to control, for example. This selection may be performed audibly or via a graphical user interface. Once selected, the robot 900 may request computer-executable instructions to communicate with the selected device (e.g., the remote 904). This may be performed by the robot 900 sending an identifier associated with the remote 904 to the server, having the server modify the instructions to accomplish a desired task (e.g., based on the previously entered selection data or new query responses), and sending the instructions to the robot 900. The received instructions may instruct the robot 900 to interact with the cable box 902 using the remote 904.

In yet another example, the user 906 may want to use a cable box 902 to view programs that are running on different television channels. In this example, however, the user may not be able to find the remote 904 and the robot 900 may not be able to identify the cable box 902. The user 906 may, therefore, act as a mediator and teach the robot 900 to communicate with the cable box 902. This may be performed using a user device, for example. Specifically, in an embodiment, the user 906 may use a user device, such as a cellular phone, to take a picture of the barcode on the cable box 902, for example. The user device may then send the picture of the identifier to the robot 900, which may send the identifier to the sever to identify computer-executable instructions to interact with the cable box 902.

In another embodiment, the user device may act as a mediator by recognizing the identifier or sending the picture of the 1D barcode to the server for recognition. Optionally, the user device may also send the server an identifier associated with the robot 900 or a model of the robot 900. The server may use the identifier and, optionally, the robot model to identify one or more instructions that may be performed by the robot 900, for example. These instructions may be sent to the user device (e.g., the cellular phone). Once received at the user device, the instructions may then be sent to the robot 900 (e.g., by physically or wirelessly connecting the cellular phone to the robot 900). In embodiments, the robot 900 may use the instructions to interact with the cable box 902 and/or the server (e.g., to obtain modified instructions).

In embodiments, the functions described above as being performed by the user may optionally be performed in whole or in part by the robot.

Figure 10:
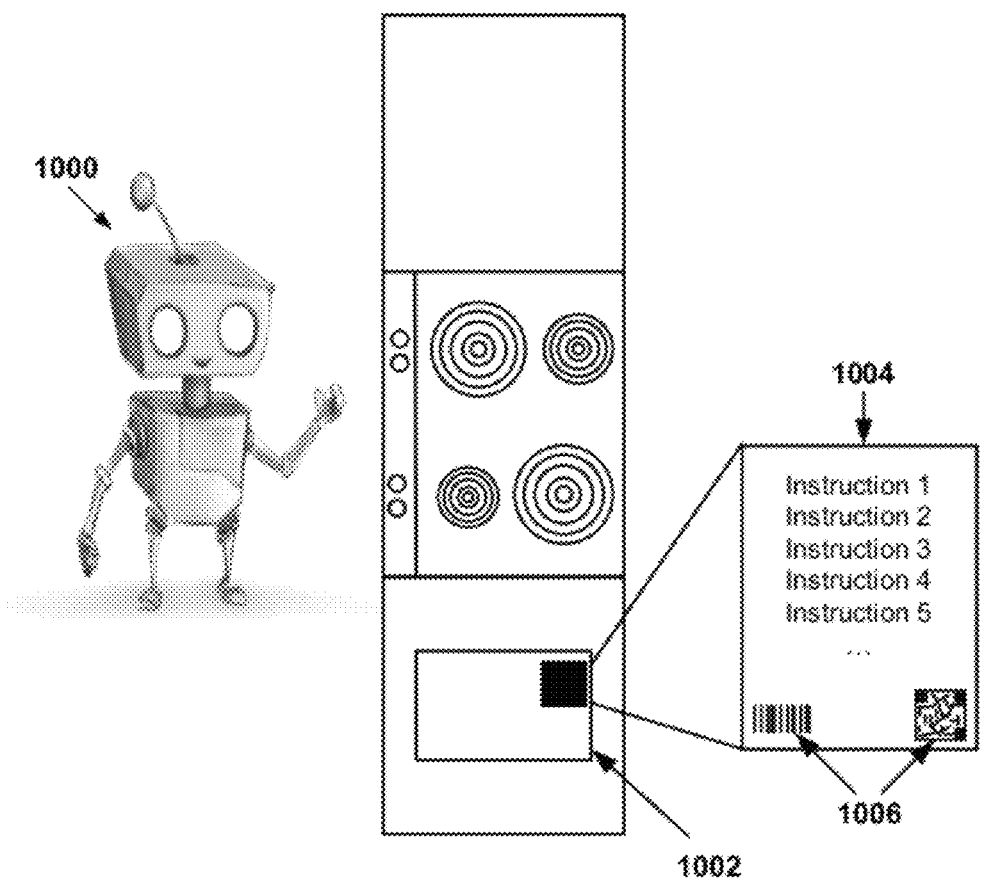
FIG. 10 is an example conceptual illustration of a robot interacting with an object based on computer-executable instructions from a server.

FIG. 10 is an example conceptual illustration of a robot 1000 interacting with an object 1002 based on computer-executable instructions from a server. In particular, FIG. 10 illustrates the robot 1000 interacting with an object, such as a pancake mix box 1002, to obtain instructions 1004 to make pancakes. The pancake mix box 1002 may include one or more instructions 1004, which may be in human readable form. The robot 1000 may obtain images of the human readable instructions 1004 and may use recognition software (located on the robot or on a server) to determine the characters and/or meaning of the human readable instructions 1004. In embodiments, the robot 1000 or server may translate the characters and/or meaning of the human readable instructions 1004 into computer-executable instructions that the robot 1000 may execute.

The pancake mix box 1004 may also or alternatively include an identifier 1006. In FIG. 10, the identifier 1006 is illustrated in multiple ways (e.g., by a 1D barcode and by a 2D barcode). The robot 1000 may scan the 1D and/or 2D barcode to obtain information associated with the identifier 1006. The robot 1000 may send the identifier to the server, which may use the identifier to identify computer-executable instructions that the robot may use to make pancakes, for example. These instructions may be sent to the robot for execution.

In embodiments, the 1D and/or 2D barcode may include information in addition to the identifier. For example, the 1D and/or 2D barcode may include computer-executable instructions which are sent to the server with the identifier. These instructions may be general instructions that may be generic and can be executable by a number of robots. Optionally, these instructions may be pseudo instructions that generally describe one or more high-level functions or processes. The server may use the received instructions or pseudo instructions to identify specific instructions that are designed to be executable by the user's robot 1000. In embodiments, the server or the robot 1000 may translate the general instructions or the pseudo instructions into specific instructions that may be executed by the robot 1000. The translation may be performed using any number of translators, for example. An example translator may lookup the general instructions or the pseudo instructions on a server that may store a table matching the general instructions or the pseudo instructions to the specific instructions. This allows general instructions to be available on the pancake mix box 1004, while allowing robot specific instructions to be accessed at the server.

In another embodiment, the robot 1000 may send the identifier to the server and the server may send a query to the user (e.g., via a user device). The query may be used to question the user on changes the user would like to make to the recipe, for example. Exemplary changes may be to use a non-dairy milk, add blueberries to the mix, lightly brown the pancakes, etc. One or more of the user's responses may be sent as a query response to the server.

In embodiments, the query may be sent to the robot 1000 instead of to the user. The robot 1000 may identify one or more changes to make to the recipe using any number of predefined rules, algorithms, historical trends, etc. For example, the robot 1000 may include a predefined rule that states that the user is lactose intolerant. Therefore, when queried about the type of milk to use in the recipe, the robot 1000 may respond with soy milk. In another example, the query may request the number of servings of pancakes to make. The robot 1000 may use historical data to calculate the average number of servings that have been made in the past, and further determine the probability that the calculated average number is a reasonable number given the day of the week and the time of day that the pancakes are being made. One or more of the robot's responses may be sent as a query response to the server.

The server may receive the query response from the user device or the robot and determine which instructions correspond to the requests in the query response. If no instructions exist (e.g., to add blueberries to the mix), the server may search for similar instructions and modify the similar instructions. This may allow the server to modify a strawberry pancake recipe into a blueberry pancake recipe, for example. Optionally, if no instructions exist, the server may send a query to the user requesting instructions, search a database of instructions to find similar instructions, query another robot 1000 associated with the cloud for similar instructions, etc. One or more of these requested instructions may be used to modify the instructions associated with the pancake mix box 1004. The modified instructions may be sent to the robot 1000, where the instructions may be executed to perform an interaction between the robot 1000 and one or more objects, such as a pan, container of milk, etc.

Figure 11:
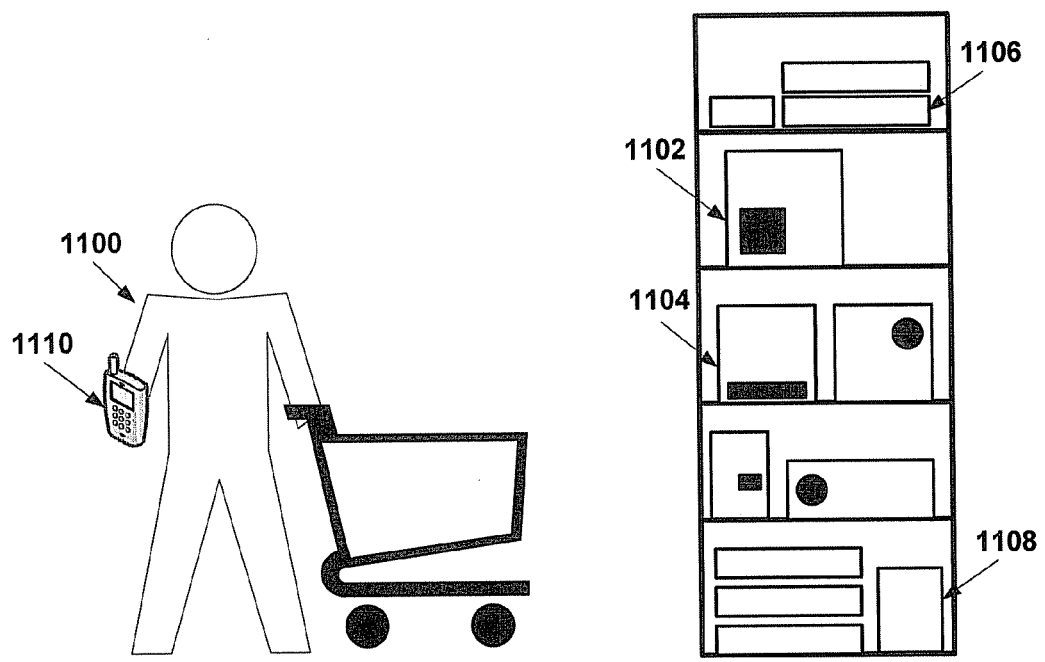
FIG. 11 is an example conceptual illustration of a user using an identifier to interact with a server.

FIG. 11 is an example conceptual illustration of a user 1100 using an identifier to interact with a server. In particular, the user 1100 may come across a number of objects 1102, 1104, 1106, 1108 (e.g., while shopping). Some of the objects 1102, 1104 may include an identifier in the form of a 1D barcode, 2D barcode, RFID, NFC chip, etc., for example. Other objects 1106, 1108 may be scanned to ascertain an identifier associated with the object 1106, 1108. In embodiments, the user 1100 may use a user device 1110 to enter information about a product and/or to scan a 1D or 2D barcode, for example. The user device 1110 may be a portable computer, cellular telephone, personal digital assistant (PDA), etc.

In an example, the user 1100 may be shopping at a store and encounter the objects 1102, 1104, 1106, 1108. The user 1100 may use the user device 1110 to scan or take a picture of a 2D barcode associated with the object 1102, for example. The user device 1110 may be used to send the 2D barcode to the server and request information about the object 1102 associated with the 2D barcode. Example information includes if the user's robot can interact with the object 1102, what models of robots can interact with the object 1102, what type of interactions the robot may have with the object 1102, if the user's robot can be updated to interact with the object 1102, etc. The server may respond by sending information related to the request to a user device 1110. The user device 1110 may display the received information to the user 1100 (e.g., via a GUI). Based at least in part on this information, a determination may be made if the user's robot can interact with the object 1102. This may affect the user's 1100 decision to purchase the object 1102.

In embodiments, the user 1100 may purchase computer executable instructions and/or robot hardware based on information received about the object 1102, 1104, 1106, 1108. For example, the user 1100 may want to purchase a new lawn mower. The lawn mower may require that robots interacting with the lawn mower have robotic hands capable of gripping the lawn mower handle. The user's 1100 robot may not have this capability. Therefore, the user 1100 may determine what robotic hands may be needed to perform the gripping activity and purchase whatever robotic hands that may be needed. Optionally, the user 1100 may search for computer-executable instructions that may allow the user's 1100 unaltered robot to grip the lawn mower handle. In embodiments, the user 1100 may purchase or otherwise obtain some or all of the instructions that would allow the robot to accomplish the desired task, write new instructions to accomplish the desired task, obtain the hardware to interact with the lawn mower, etc.

Computer-executable instructions may be added to a server or robot in a number of ways. For example, the user 1100 or a third party (e.g., a manufacturer, distributor, etc.) may create and upload instructions to a server or to a robot. The instructions may be specific to the object (e.g., instructions for the object to receive a communication on a predefined channel.) Further, the instructions may be specific to the robot (e.g., instructions to open or close a robotic hand.) Additionally, the instructions may be specific to an interaction or type of interaction (e.g., a robotic hand turning a knob on the object.) Instructions may allow for mechanical, electromechanical, and/or electrical interactions, which may be performed in conjunction with one another, in serial to one another, etc.

In embodiments, instructions may be specific or general. Specific instructions may include detailed instructions that instruct a robot to interact with the object. For example, when opening a door, specific instructions may include step by step instructions for the robot to lift a robotic arm 45 degrees, open the right robotic hand four inches in radius, move forward one foot, close the robotic hand to a two inch radius, rotate the robotic hand 45 degrees clockwise, pull with a specified force, etc. Unlike specific instructions, general instructions may be broad. For example, general instructions may instruct a robot to open a door having a round door handle. The robot and/or the server may take the general instructions and add robot specific instructions that allow the robot to open the door with the round door handle, for example. Moreover, in cases where there are multiple general instructions, the robot and/or server may determine which of the general instructions are needed for the robot to perform a desired interaction with the object and filter the instructions accordingly.

The process of filtering the instructions may include determining one or more capabilities that the robot may need to perform a task. Example capabilities of the robot may include hardware, software, mechanical, electrical, and/or or electromechanical capabilities. The server may associate one or more of the capabilities with the robot via a manifest, for example. The manifest may indicate what capabilities a robot having a specific model, make, unit, etc., may include. One or more of the robot's capabilities may be compared to the capabilities that may be needed to perform the task. A match may indicate that the robot may be capable of performing the task. The number and type of capabilities that may need to match for the robot to perform the task may vary in embodiments.

Upon purchasing a new object, the user 1100 may take the new object home or to the user's office, for example. In embodiments, the user 1100 may update the server with data to indicate that the new object is in the user's home or office. In other embodiments, the user may allow a robot to scan the new object and communicate to the server the location of the new object in the area, for example. The server may associate the new object with one or more robots located in the area. This association may include identifying which of the one or more robots is configured to interact with the new object. The server may communicate this information to one or more of the robots. The robots may use this information to determine what robots may be capable of interacting with the new object.

As an example, the user 1100 may purchase a grill. When the user returns home, the user may scan an identifier associated with the grill to the server. This scan may be performed using a user device, a robot, etc. The server may recognize the identifier as associated with an outdoor grill, for example. The server may use this information to determine that robots that can go outside and that have robotic hands for turning dials are capable of interacting with the grill. The server may send this information to the robots once the information is determined or may send this information to the robot when the robot scans an identifier associated with the grill. If the robot recognizes that the robot cannot interact with the object, the robot may forego an attempt to interact with the object. In embodiments, the robot may instead recommend a different robot to interact with the object.

In other embodiments, the user 1100 may be shopping for a new robot that is capable of interacting with one or more of the user's 1100 objects. The determination of whether the robot is capable of interacting with one or more of the user's 1100 objects may be performed by comparing the new robot's specification to one or more requirements associated with the user's objects. Example requirements include an amount of processing power, memory, sensors, appendages, etc. If the robot includes the requirements, the robot may be capable of interacting with the object.

In an example, the user 1100 may be searching for a new robot that may be capable of interacting with the user's 1100 grill as well as the user's cable box. To interact with the grill, the new robot may need a temperature sensor and an alarm to indicate when meat may be prepared to a desired doneness, for example. To interact with the cable box, the new robot may need an IR sensor that is capable of receiving and transmitting information wirelessly, for example. The user 1100 may store this object data on a user device and/or obtain this object information via a server. The user 1100 may compare the new robot's specification to the object data (e.g., the temperature sensor, alarm, and infrared sensor data) to determine if the new robot includes the object data. Based at least in part on this information, a determination may be made if the new robot can interact with the users' objects. This may affect the user's 1100 decision to purchase the new robot.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

What is claimed is:

1. A method performed by a computing system having a processor and memory, the method comprising:
   receiving from a robotic device an identifier of an object, wherein the robotic device includes a mechanical actuator;
   based on the identifier, determining a manufacturer of the object;
   identifying in a database first instructions associated with the identifier of the object, wherein the first instructions are manufacturer instructions associated with the manufacturer of the object, and wherein the manufacturer instructions are executable by the robotic device to interact with the object;
   sending a query to the robotic device regarding an interaction between the robotic device and the object;
   receiving a query response indicating information associated with the interaction between the robotic device and the object;
   based on the query response, modifying, by the computing system, the first instructions to obtain second instructions that are executable by the robotic device to perform the interaction with the object; and
   sending the second instructions to the robotic device.

2. The method of claim 1, further comprising:
   receiving an identifier of the robotic device; and
   identifying in the database the first instructions associated with both the identifier of the robotic device and the identifier of the object.

3. The method of claim 1, further comprising:
   performing object recognition on the object; and
   identifying the first instructions based on the object recognition.

4. The method of claim 1, further comprising providing a query requesting information associated with the interaction when a plurality of interactions between the robotic device and the object are possible.

5. The method of claim 1, wherein identifying the second instructions executable to perform the interaction includes modifying the first instructions by filtering the first instructions to include the first instructions that are required to perform the interaction.

6. The method of claim 1, wherein the first instructions are generic to a plurality of robotic devices and the second instructions are specific to the robotic device.

7. The method of claim 6, wherein identifying the second instructions executable to perform the interaction includes modifying the first instructions to be specific to the robotic device.

8. The method of claim 1, wherein identifying the second instructions executable to perform the interaction includes modifying the first instructions to match default instructions identified in the query response, wherein the default instructions are executable by the robotic device.

9. A computing system comprising:
   at least one processor;
   a computer-readable medium; and
   program instructions stored on the computer-readable medium and executable by the at least one processor to cause the computing system to:
      receive from a robotic device an identifier of an object;
      based on the identifier, determine a manufacturer of the object;
      identify in a database first instructions associated with the identifier of the object, wherein the first instructions are manufacturer instructions associated with the manufacturer of the object, and wherein the manufacturer instructions are executable by the robotic device to interact with the object;
      send a query to the robotic device regarding an interaction between the robotic device and the object;
      receive a query response indicating information associated with the interaction between the robotic device and the object;
      based on the query response, modify the first instructions to obtain second instructions executable by the robotic device to perform the interaction with the object; and
      send the second instructions to the robotic device.

10. The computing system of claim 9, wherein the program instructions are executable by the at least one processor to modify the first instructions to include default instructions identified in the query response, wherein the default instructions are executable by the robotic device.

11. The computing system of claim 9, wherein the first instructions are generic to a plurality of robotic devices and the second instructions are specific to the robotic device.

12. The computing system of claim 9, wherein the identifier of the object includes one of a barcode and a radio-frequency identification.

13. The computing system of claim 9, wherein the identifier of the object includes human readable instructions.

14. The computing system of claim 9, wherein the query response indicates an electronic interaction that is executable to cause the robotic device to interact with the object.

15. A computer-readable medium having stored thereon instructions executable by a computing device having at least one processor to cause the computing device to perform functions comprising:
   receiving from a robotic device an identifier of an object, wherein the robotic device includes a mechanical actuator;
   based on the identifier, determine a manufacturer of the object;
   identifying in a database first instructions associated with the identifier of the object, wherein the first instructions are manufacturer instructions associated with the manufacturer of the object, and wherein the manufacturer instructions are executable by the robotic device to interact with the object;
   sending a query to the robotic device regarding an interaction between the robotic device and the object;
   receiving a query response indicating information associated with the interaction between the robotic device and the object;
   based on the query response, modifying the first instructions to obtain second instructions that are executable by the robotic device to perform the interaction with the object; and
   sending the second instructions to the robotic device.

16. The computer-readable medium of claim 15, wherein identifying the second instructions executable to perform the interaction includes modifying the first instructions by filtering the first instructions to include the first instructions that are required to perform the interaction.

17. The computer-readable medium of claim 15, further comprising instructions executable by the computing device to cause the computing device to perform functions comprising:
   receiving an identifier of the robotic device; and
   identifying in the database the first instructions associated with both the identifier of the robotic device and the identifier of the object.

18. The computer-readable medium of claim 15, further comprising instructions executable by the computing device to cause the computing device to perform functions comprising:
   identifying a robot requirement associated with the first instructions, wherein the robot requirement includes at least one of a robot memory and a robot processor; and
   determining whether the first instructions are executable by the robotic device based on the robot requirement.

19. The computer-readable medium of claim 15, wherein the manufacturer instructions are generic to a plurality of robotic devices.

20. The computer-readable medium of claim 15, wherein the identifier of the object includes one of a barcode and a radio-frequency identification.

* * * * *